T. E. C. WHEELER.
CINEMATOGRAPH CAMERA.
APPLICATION FILED OCT. 7, 1915.

1,163,493.

Patented Dec. 7, 1915.
2 SHEETS—SHEET 1.

Inventor.
T. E. C. Wheeler.

T. E. C. WHEELER.
CINEMATOGRAPH CAMERA.
APPLICATION FILED OCT. 7, 1915.
1,163,493.
Patented Dec. 7, 1915.
2 SHEETS—SHEET 2.
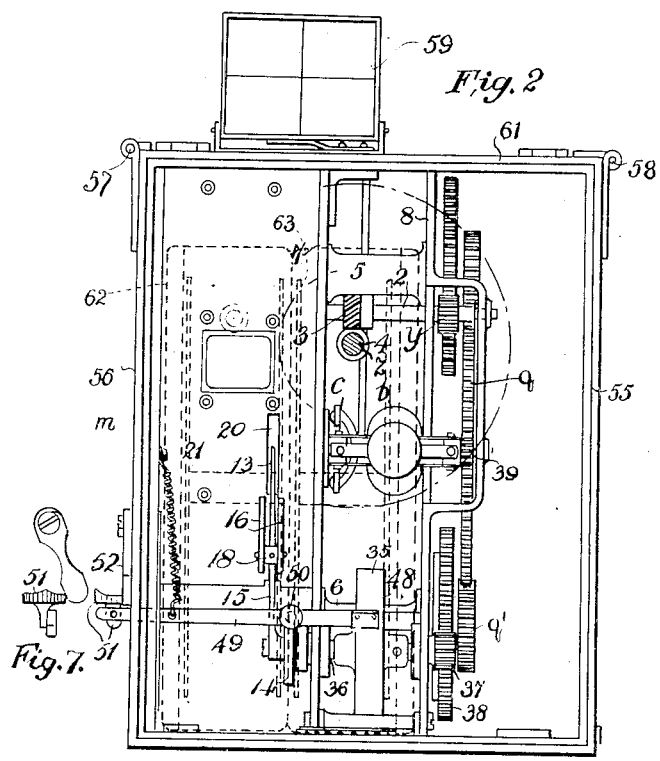
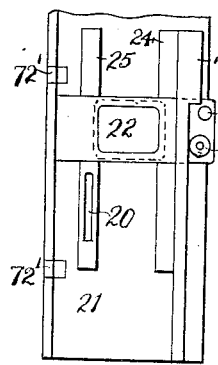
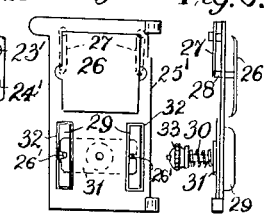
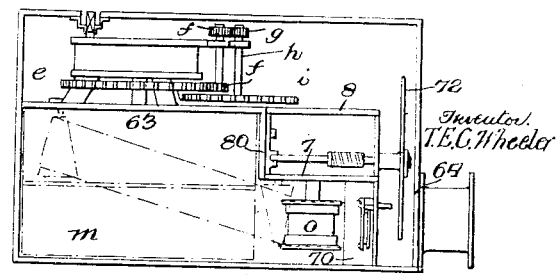
Inventor,
T.E.C. Wheeler
by Jno. Imrie atty

UNITED STATES PATENT OFFICE.

THOMAS EDWARD CARNAL WHEELER, OF LONDON, ENGLAND, ASSIGNOR TO CHERRY KEARTON, OF LONDON, ENGLAND.

CINEMATOGRAPH-CAMERA.

1,163,493.      Specification of Letters Patent.      Patented Dec. 7, 1915.

Application filed October 7, 1915. Serial No. 54,695.

*To all whom it may concern:*

Be it known that I, THOMAS EDWARD CARNAL WHEELER, a subject of the King of Great Britain, residing at London, England, have invented certain new and useful Improvements in Cinematograph-Cameras, of which the following is a specification.

This invention relates to an improved spring driven cinematograph camera.

The chief object of the present invention is to enable the camera to be driven by a single spring motor. This object is attained by providing two parallel spaced walls within the camera box, one of these walls forming the division wall or part of the same between the gearing compartment and the spool compartment. The cross spindles are effectively supported in these walls and the friction of the working parts is reduced so that one spring motor such as is used for driving gramophones is adequate to operate the film feed, the shutter and the take up. It is possible in practice to put a length of about 200 feet of film through with one winding of the motor.

Another object is to make the camera of reasonable size and shape. This is effected by employing a spool box which accommodates the take up and delivery spools on one spindle side by side, the take up spool being driven and the delivery spool being free on the spindle.

Figure 1:
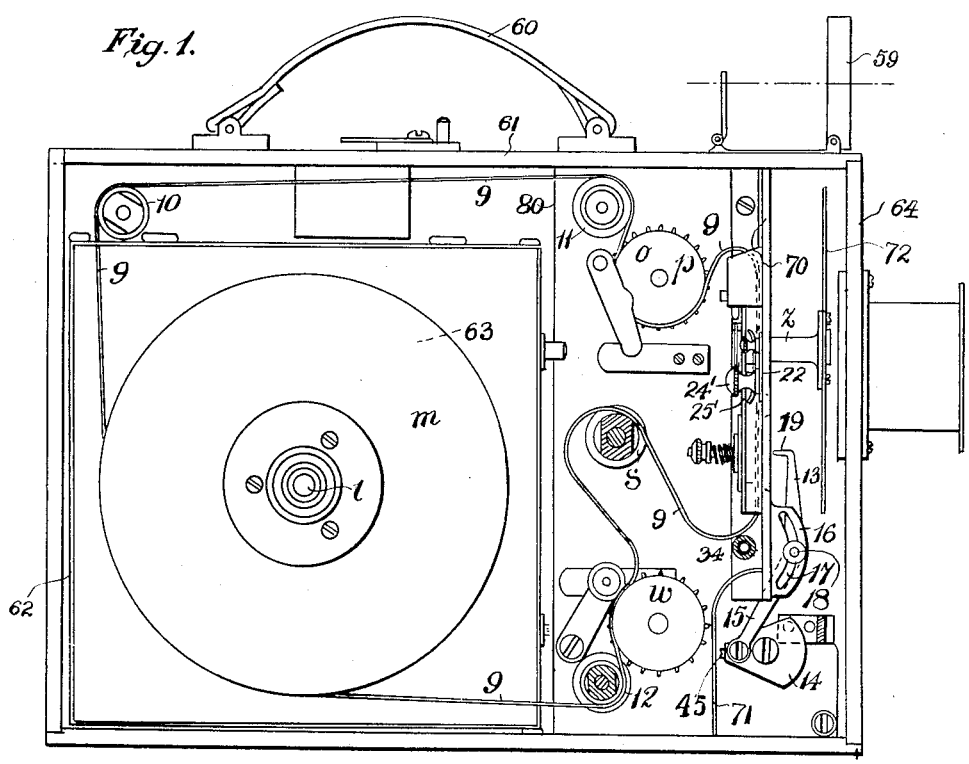
Figure 3:
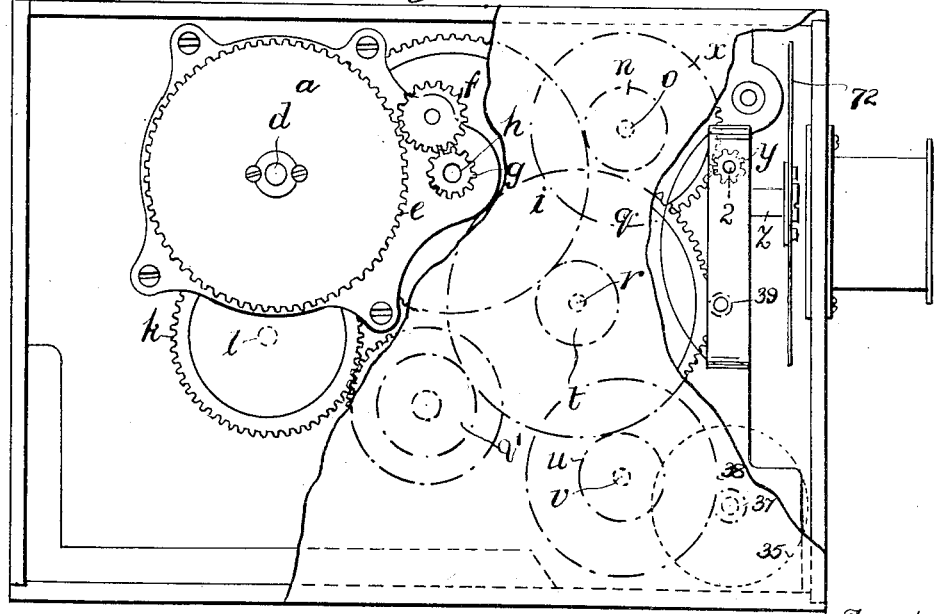

These and other features of the invention will be readily understood from the following detailed description of the form illustrated by way of example in the accompanying drawings in which:

Figure 1 is a side elevation of the camera looking on the spool box compartment with the side door removed to reveal the interior. Fig. 2 is a view looking from the right hand toward the left in Fig. 1 with the front of the camera box removed. Fig. 3 is a view in elevation, such as would be obtained in a looking glass placed opposite the camera, with the side wall of the gearing compartment partly broken away. This form of view has been adopted to facilitate the comparison with Fig. 1. Fig. 4 is an elevation of the fixed plate with mask and film guide opposite the exposure point. Fig. 5 is a view looking on the pressure face of the gate or hinged backing plate. Fig. 6 is a side view of the backing plate. Fig. 7 is a detail view of the external controlling means for the starting brake. Fig. 8 is a horizontal section illustrating the dividing wall which separates the film compartment from the adjacent compartment containing the mechanism for operating the feed.

In carrying the invention into effect the camera case or box is divided longitudinally by a wall 7 extending from the point 80 up to the inner front wall 70. The side walls 55 and 56 parallel with the wall 7 are suitably hinged to the top board as for instance at 57 and 58. The view finder 59 and handle 60 are accommodated on the top board 61 of the camera box. The compartment to the left of the wall 7 in Fig. 2 and rear of the corner 80 in Fig. 1 and between these and the side panel 56 is the spool compartment containing the spool box 62 in which I have shown both the take up spool $m$ and the delivery spool 63 accommodated on the same axis $l$ side by side. It is not necessary to put the spools in the same box. The take up spool $m$ is rigidly mounted on the spindle $l$ to rotate therewith while the spool 63 is loosely mounted on this spindle.

Between the spool box 62 and the front board 64 of the camera box there is a space in which the film guiding and feeding mechanism is disposed. The shutter 72 and the feeding claw are accommodated in a compartment at the front of the camera between the wall 70 and its prolongation 71 and the front board 64 of the camera.

Parallel with the wall 7 and spaced therefrom on the opposite side to the spool box compartment of the camera there is a wall 8 which constitutes in its rear part the division wall of the camera. The compartment between the wall 7 and the side 55 of the camera box is the motor and gearing compartment and this compartment also contains the parallel spaced wall 8. Between the walls 7 and 8 there are arranged the various spindles transversely to and penetrating the walls. In this intermural space there are also accommodated the shutter driving gear, the speed regulator and a flywheel and brake ring 35. The spring motor $a$ is fixed to the wall 8 on the side thereof remote from the wall 7. Similarly all the gearing wheels are arranged overhung on this side of the wall 8 so that easy access is obtained for inspecting, cleaning and lubricating these parts simply by opening the side 55.

The spring motor *a* is indicated by its outer casing and is of any suitable and powerful type as will be readily understood.

The driving spindle *d* of the motor *a* is provided with a toothed wheel *e* adapted to mesh with an intermediate wheel *f* in mesh with another wheel *g* on the same spindle *h* as the wheel *i*. The wheel *i* meshes with a wheel *t* on the spindle *r* of a wheel *q* driving a wheel *n* on the spindle *o* of the upper film sprocket pinion *p*. The spindle *r* carries a film guide roller *s*, while the wheel *q* on this spindle *r* also drives a wheel *u* on the spindle *v* of the lower sprocket pinion *w*. The wheel *q* moreover, through an intermediate wheel *q'* drives the wheel *k* on the spindle *l* of the take up spool *m* which spool is thereby driven positively. A wheel *x* on the upper sprocket spindle is used to drive the shutter spindle *z* through a small toothed pinion *y* on the spindle 2 carrying a helical gear wheel 3 meshing with a similar gear wheel 4 on the shutter spindle *z*. The spindles for the upper and lower sprocket pinions are preferably carried in ball bearings contained in hubs or sleeves 5 and 6 mounted in two spaced partitions 7 and 8 forming part of the main framing.

The spool spindle *l* is parallel to the sprocket pinions and is adapted to take two spools side by side, one being fixed and the other free. It is preferred to fix the take up spool on the spindle so that it is positively driven and to let the feeding or delivery spool run freely.

The film 9 from the delivery spool *m* is led over suitable guide rollers such as conical rollers 10 and 11 to the upper sprocket pinion *p* down through the gate to the lower sprocket pinion *w* and thence over a guide roller 12 to the take up spool *m*, suitable tension rollers being used if desired.

The film 9 is preferably given the required intermittent travel through the gate by means of a claw 13. The claw 13 is actuated in known manner by a crank 14 and connecting rod 15 in conjunction with one or a pair of stationary slotted cams, for instance a pair of vertical stationary plates 16 are arranged parallel to one another above the crank 14. They have curved slots 17 in them, and a transverse pin 18 is adapted to work in the two slots 17. One end of the connecting rod 15 from the crank 14 is connected to the pin 18 and the pin is situated at the lower end of an arm 13 terminating in a tooth 19 and forming the claw. Thus as the crank 14 rotates, the tooth 19 of the claw 13 will first move inwardly to enter one of the perforations in the film, move downwardly so as to draw down the film, then move outwardly to release the film and finally move up into the original position ready to move in again.

The claw passes through a slot 20 in the plate 21 adjacent to the gate. By using a single claw engaging within one series of perforations in the film any irregularity in the relation of the two sets of perforations in the film does not interfere with the operation. The stroke of the claw may be varied by adjusting a screw 45.

The plate 21 is provided with a transverse sliding aperture plate or mask 22, which is inserted through a slotted guide bar or bridge 23 on one side and works between the edges of fixed guides 24, 25. By this means the plate or mask 22 can be easily withdrawn and replaced by another having an aperture of different size or shape. The end of the mask plate 22 preferably has a small knob or handle 23' and may or may not have a screw 24' or other fastening. The door or gate proper 25' is hinged preferably at 72' on the opposite side to that from which the mask or aperture plate is inserted. The door or gate 25' has a light pressure plate or backing plate 26 lightly pressed forward by two leaf springs 27 situated on the rear of the door and bearing on pins 28 passing through holes in the door and carrying the plate. Below the backing plate are two pressing feet or tension runners 29 which if desired may be grooved vertically. They are pressed forward lightly by a coiled spring 30 which acts on a plate 31 extending across the door and on the rear of the runners. The runners 29 work through slots 32 in the door 25' and have pins 26' entering guide slots in the plate 31. The spring 30 is coiled around a center pin having a milled nut 33 or like adjustment. The guide roller indicated at 34, Fig. 1, may be suitably mounted below the gate 25'.

In order to steady the drive a fly wheel may be used in any appropriate place. It is preferred to fit a small fly wheel 35 on the crank shaft 36 driving the claw and which shaft has a pinion 37 conveniently driven off a wheel 38 on the spindle of the lower sprocket pinion. A starting brake 48 acts on the fly wheel. It is carried by a lever 49 pivoted at 50 and provided with a thumb piece 51 on its outer end. The brake can be maintained in the "off" or "running" position by a pivoted catch 52, Fig. 7, adapted to hold the outer end 51 of the lever depressed.

The spindle of the governor *b* carries a pinion 39 driven by a wheel *q*.

Obviously many of the details referred to may be varied in construction and arrangement.

While the invention is particularly applicable to hand cameras, it may be used with fixed or heavier types of apparatus.

I claim:—

1. In combination in a cinematograph camera case, a division wall dividing the case, a spindle in one compartment, a take up spool mounted to rotate with said spindle, a delivery spool mounted loosely on said spindle adjacent to said take up spool, a spring motor in the other compartment, film feed mechanism, a shutter and gearing from said spring motor to said take up spool, film feed and shutter mechanism.

2. In combination in a cinematograph camera case, a division wall dividing the camera case into two halves, a parallel wall, spaced from said division wall, bearings in said walls, spindles mounted in said bearings, a spring motor in one half of the casing, gearing on said spindles and on the same side of the parallel walls as the motor, and film delivery and take up mechanism in the other side of the casing.

3. In a camera case, a dividing wall separating said case into two compartments, a spool box in one compartment, film feed mechanism also located in said compartment, spindles passing through said dividing wall, a parallel wall, spaced from said dividing wall and on the side thereof remote from the spool box, bearings for said spindles in said parallel wall, gearing on said spindles on the side of said parallel wall remote from said division wall and a spring motor on the same side of said parallel wall as said gearing and fixed to said wall.

4. In a camera case, a dividing wall separating said case into two compartments, a spool box in one compartment, film feed mechanism also located in said compartment, spindles passing through said dividing wall, a parallel wall, spaced from said dividing wall and on the side thereof remote from the spool box, bearings for said spindles in said parallel wall, a speed governor located between said walls, gearing on said spindles on the side of said parallel wall remote from said division wall and a spring motor on the same side of said parallel wall as said gearing and fixed to said wall.

5. In a camera case a dividing wall separating said case into two compartments, a spool box in one compartment, film feed mechanism also located in said compartment, spindles passing through said dividing wall, a parallel wall, spaced from said dividing wall and on the side thereof remote from the spool box, bearings for said spindles in said parallel wall, a flywheel located between said walls and mounted on one of the spindles, gearing on said spindles on the side of said parallel wall remote from said division wall and a spring motor on the same side of said parallel wall as said gearing and fixed to said wall.

6. In a camera case a dividing wall separating said case into two compartments, a spool box in one compartment, film feed mechanism also located in said compartment, spindles passing through said dividing wall, a parallel wall, spaced from said dividing wall and on the side thereof remote from the spool box, bearings for said spindles in said parallel wall, a shutter rotatable about an axis transverse to said spindles, gearing on one of said spindles and located between the walls for driving said shutter, gearing on said spindles on the side of said parallel wall remote from said division wall and a spring motor on the same side of said parallel wall as said gearing and fixed to said wall.

7. In a camera case, a dividing wall separating said case into two compartments, a spool box in one compartment, film feed mechanism also located in said compartment, spindles passing through said dividing wall, a parallel wall, spaced from said dividing wall and on the side thereof remote from the spool box, bearings for said spindles in said parallel wall, a flywheel located between said walls and mounted on one of the spindles, a starting brake operable on said flywheel and means external to the camera case for controlling said starting brake, gearing on said spindles on the side of said parallel wall remote from said division wall and a spring motor on the same side of said parallel wall as said gearing and fixed to said wall.

In testimony whereof I have signed my name to this specification in the presence of two subscribing witnesses.

THOMAS EDWARD CARNAL WHEELER.

Witnesses:
HELEN MATHYS,
PETER S. H. ALEXANDER.